(12) United States Patent
Slagerman

(10) Patent No.: US 6,312,002 B1
(45) Date of Patent: Nov. 6, 2001

(54) WHEEL LOCK AND WHEELCHAIR WITH A WHEEL LOCK

(75) Inventor: Murray G. Slagerman, Lafayette, CO (US)

(73) Assignee: Sunrise Medical HHG, Inc., Longmont, CO (US)

( * ) Notice: Subject to any disclaimer, the term of this patent is extended or adjusted under 35 U.S.C. 154(b) by 0 days.

(21) Appl. No.: 09/332,472

(22) Filed: Jun. 14, 1999

(51) Int. Cl.$^7$ ..................................................... B62M 1/14
(52) U.S. Cl. ................................ 280/304.1; 280/250.1; 188/2 R
(58) Field of Search ............................ 280/304.1, 250.1; 188/2 R, 69, 29

(56) References Cited

U.S. PATENT DOCUMENTS

| | | | |
|---|---|---|---|
| 3,556,260 | * | 1/1971 | Meyer ................................. 188/2 F |
| 4,560,033 | * | 12/1985 | Dewoody et al. ................ 280/304.1 |
| 4,749,064 | * | 6/1988 | Jinno et al. ....................... 280/250.1 |
| 4,768,797 | * | 9/1988 | Friedrich ........................... 280/250.1 |
| 4,786,072 | * | 11/1988 | Girvin ............................... 280/304.1 |
| 4,805,931 | | 2/1989 | Slasor ............................... 280/250.1 |
| 4,887,830 | * | 12/1989 | Fought et al. ..................... 280/304.1 |
| 4,987,978 | * | 1/1991 | Jungersen ......................... 280/304.1 |
| 5,076,390 | | 12/1991 | Haskins ............................ 280/250.1 |
| 5,174,418 | * | 12/1992 | Le et al. ........................... 280/250.1 |
| 5,232,236 | * | 8/1993 | Korpi ............................... 280/304.1 |
| 5,472,066 | * | 12/1995 | Schillo et al. ...................... 188/2 F |
| 5,884,928 | * | 3/1999 | Papac ............................... 280/304.1 |

* cited by examiner

*Primary Examiner*—Brian L. Johnson
*Assistant Examiner*—Matthew Luby
(74) *Attorney, Agent, or Firm*—MacMillan, Sobanski & Todd, LLC

(57) ABSTRACT

A wheel lock comprises a mounting bracket that is attachable to the wheelchair side frames. A toggle assembly supported by the mounting bracket has an interference member that is engageable with the wheelchair wheel. A lever linked to the toggle assembly is displaceable to effect movement of the toggle assembly to engage the interference member with the wheelchair wheel. The mounting bracket may be integral with a wheelchair caster housing. A wheelchair includes an integral mounting bracket and caster housing attachable to a front portion of the wheelchair side frame. The mounting bracket supports a toggle assembly having an interference member. A lever linked to the toggle assembly is displaceable to effect movement of the toggle assembly to engage the interference member with the wheelchair wheel.

10 Claims, 5 Drawing Sheets

WHEEL LOCK AND WHEELCHAIR WITH A WHEEL LOCK

BACKGROUND OF THE INVENTION

1. Field of the Invention

This invention relates in general to land vehicles, and in particular, to wheelchairs. More particularly, the invention relates to a wheel lock for a wheelchair.

2. Description of the Prior Art

Wheelchairs are well known forms of transportation that increase the mobility of the physically impaired. Wheelchairs are typically relatively small, single-person conveyances that generally comprise a seat supported by a frame which, in turn, is supported by two oppositely disposed rear drive wheels and front casters. The rear wheels are usually located behind the center of gravity of the wheelchair occupant and the front casters are swivel-mounted to the wheelchair frame to permit the occupant to maneuver the wheelchair with greater ease.

Wheelchairs may be provided with a brake for slowing or stopping the motion of the wheelchair, especially by contact friction. A brake is not to be confused with a lock, a device that securely holds the wheelchair in place so as to make the wheelchair immobile.

Wheel locks are well known. Conventional locks typically comprise a toggle assembly and a lever arm that cooperates with the toggle assembly to effect movement of the toggle assembly. The locks are generally mounted to the upper or lower side fame tubes. The disadvantages of mounting the locks to the upper side frame tubes are as follows: the interference members are located too close to the wheelchair occupant's hands during propulsion; the locks occupy valuable mounting space that could be used for other component parts, such as the arm rests; and the lever arm sticks up sufficiently above the upper side frames to interfere with the transfer of the wheelchair occupant into and out of the wheelchair. The disadvantages of mounting the locks to the lower side frame tubes are as follows: the locks are too low to be readily accessible or have a very long lever arm that may interfere with the transfer of the wheelchair occupant.

A need exists for a wheelchair lock that is easily adaptable to suit the needs of the occupant. A need exists for a simple yet dependable wheelchair lock that is easily accessible and a suitable low-cost alternative to generally cumbersome conventional wheelchair locks.

SUMMARY OF THE INVENTION

This invention relates to a wheel lock for a wheelchair. The wheel lock comprises a mounting bracket. The mounting bracket is attachable to a front portion of each side frame of the wheelchair. The mounting bracket supports a toggle assembly. The toggle assembly has an interference member. The interference member is engageable with the wheelchair tire. A lever is linked to the toggle assembly. The lever is displaceable to effect movement of the toggle assembly to engage the interference member with the wheelchair wheel.

Another embodiment of the invention further comprises a caster housing plate bracket and a mounting bracket. The mounting bracket is attachable to a front portion of each side frame of the wheelchair. The mounting bracket is integral with the caster housing.

Yet another embodiment of the invention comprises a wheelchair having side frames. A caster housing and a wheel lock mounting bracket are attachable to a front portion of the side frames. The mounting bracket supports a toggle assembly. The toggle assembly has an interference member that is engageable with the wheelchair tire. A lever linked to the toggle assembly is displaceable to effect movement of the toggle assembly to engage the interference member with the wheelchair tire.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
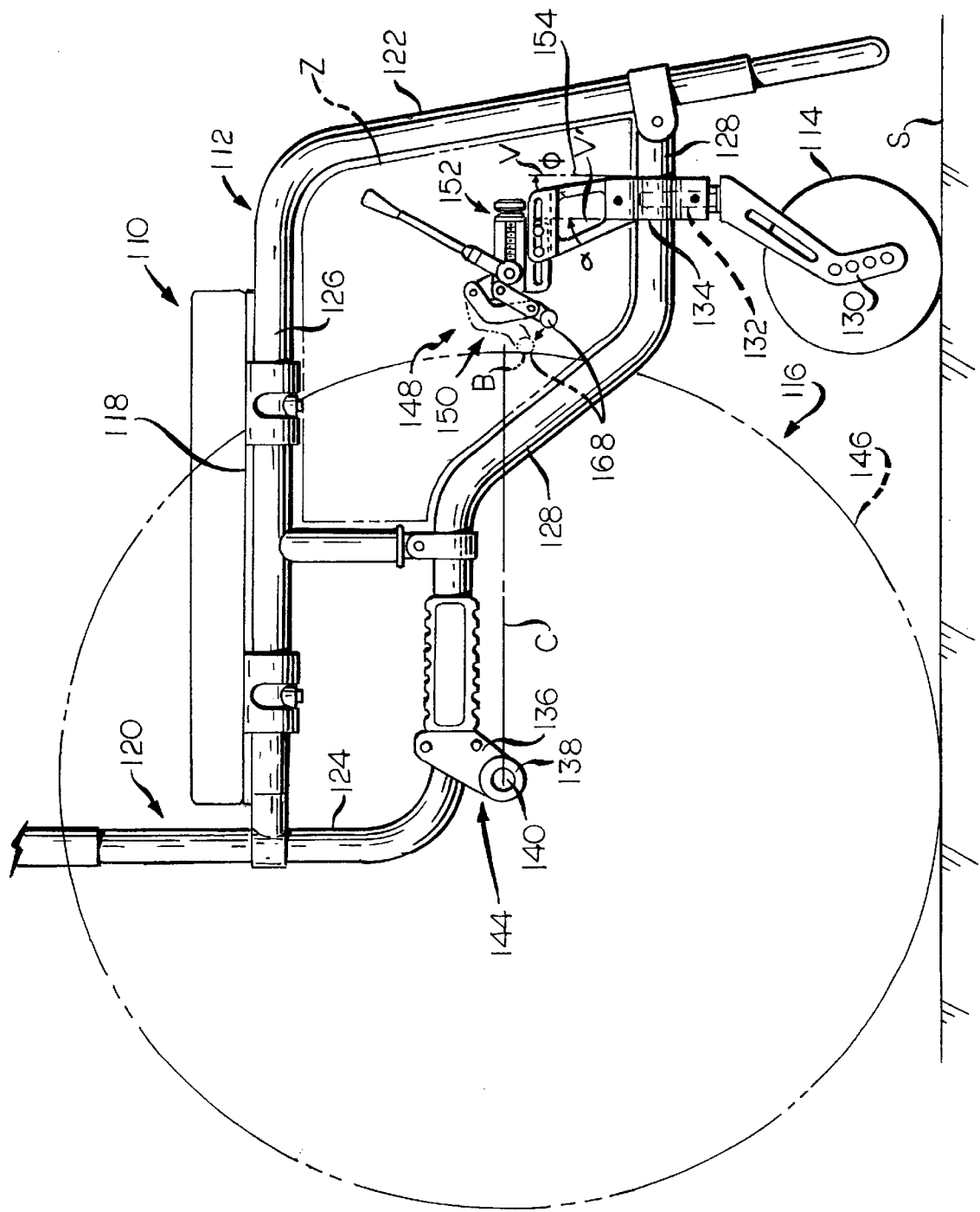
FIG. 1 is a side elevational view of a wheelchair having a lock according to the present invention.

Referring now to the drawings, there is illustrated in FIG. 1 wheelchair 110 comprising side frames 112 supported on a support surface S by opposing front casters 114 and rear drive wheels 116. The side frames 112 are laterally spaced apart and support a laterally extending seat panel 118 and seat back 120. The seat panel 118, in turn, supports a seat cushion. To simplify the description of the invention, only one side of the wheelchair 10 is shown.

Each side frame 112 preferably includes vertically extending front and rear frame tubes 122 and 124 and longitudinally extending upper frame tube or seat tube 126 and lower frame tube 128 supported by the front and rear frame tubes 122 and 124.

The front casters 114 each are rotationally supported by a caster fork 130. The caster fork 130 includes a fork stem 132 that engages a caster housing 134 so as to swivel relative to the caster housing 134. The caster housing 134 is rigidly mounted to a front portion of the side frame 112, and preferably mounted to a lower portion of the front frame tube 122 or a front portion of the lower frame tube 128.

An axle plate bracket 136 may be rigidly connected to a rear portion of each side frame 112, and preferably to a rear portion of each lower frame tube 128. The axle plate bracket 136 is provided with an opening 138 for receiving axle sleeve 140 extending from the hub 144 of each rear wheel 116 for attaching the rear wheel 116 to the side frame 112 of the wheelchair 110.

Figure 2:
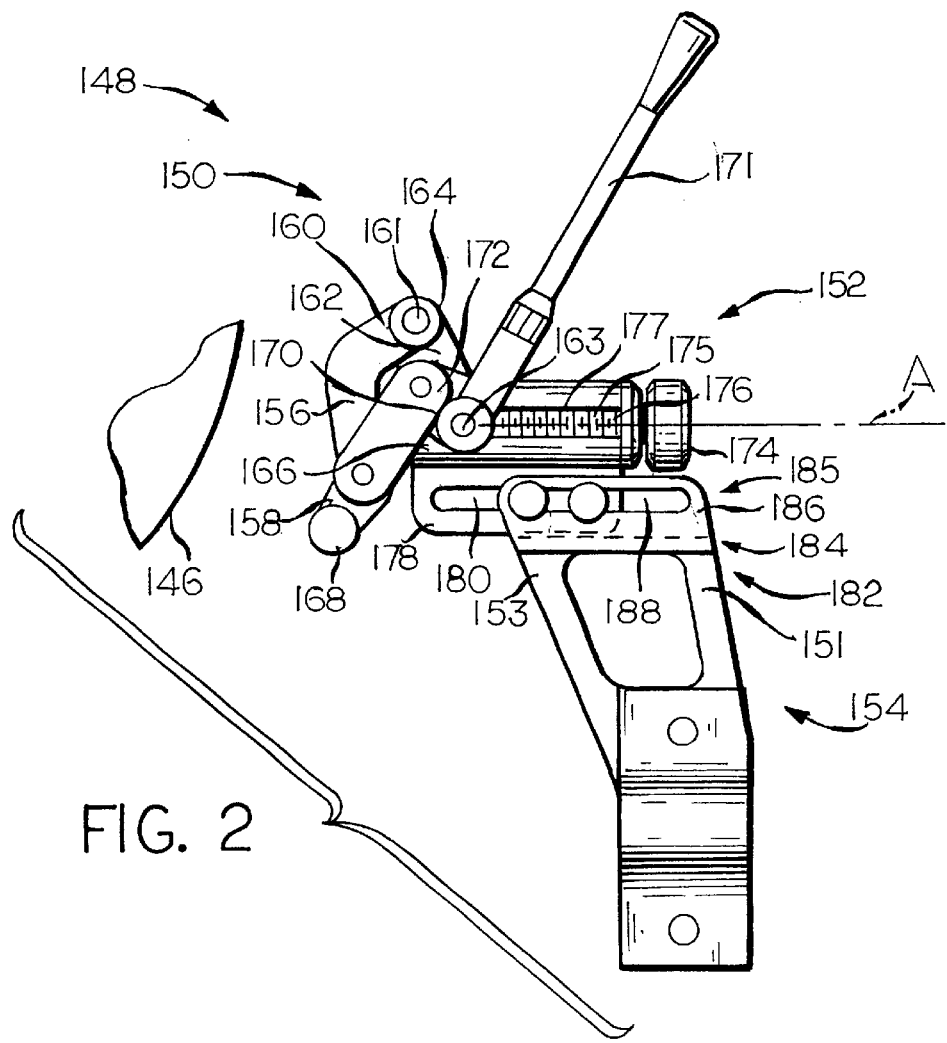
FIG. 2 is a partial side elevational view of a lock according to the present invention in an unlocked position.

As shown in FIG. 2, a wheel lock 148 of the present invention is provided for a wheelchair, such as the wheelchair 110 shown in drawings and described above. The wheel lock 148 is mounted out of the way of the rear wheels 116 so as not to be obstructed by the rear wheels 116 or interfere with the propulsion of the wheelchair 110.

The wheel lock 148 comprises a toggle assembly 150, a slide block 152, and a mounting bracket 154. The slide block 152 pivotally supports the toggle assembly 150. The mounting bracket 154, in turn, supports the slide block 152. The mounting bracket 154 is rigidly attached to the side frame 112 of the wheelchair 110.

The toggle assembly 150 comprises a first support 156 and a second support 162. The first support 156 has a first end 158 and a second end 160. Likewise, the second support 162 has a first end 164 and a second end 166. The first and second supports 156 and 162 are substantially planar in construction and lie in substantially vertical planes.

An interference member 168, such as the knurled pin shown, extends from the first end 158 of the first support 156. The interference member 168 preferably extends substantially perpendicularly from the first end 158 of the first support 156 and lies in a substantially horizontal plane. Although the interference member 168 preferably lies in a substantially horizontal plane, the interference member 168 may be arranged in other orientations sufficient to engage the rear wheel 116 of the wheelchair 110.

The second end 160 of the first support 156 is coupled to the first end 164 of the second support 162 by a first pivot pin 161. The second end 166 of the second support 162 is connected to a lower end 170 of a lever 171 by a second pivot pin 163. The first end 158 of the first support 156 is linked to the lower end 170 of the lever 171 by a link 172.

Figure 3:
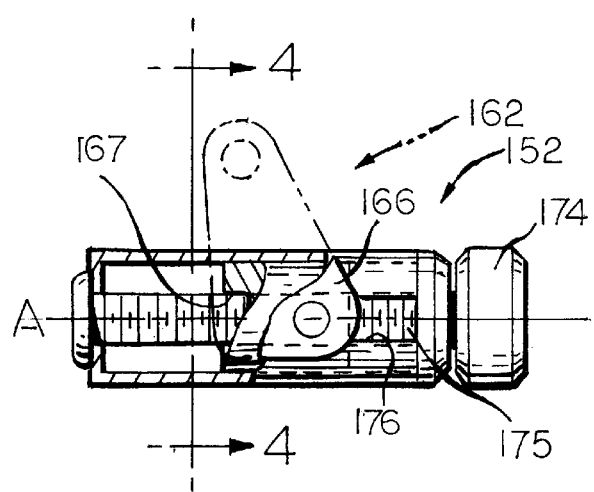
FIG. 3 is a partial cutaway view of the lock shown in FIG. 2.
Figure 4:
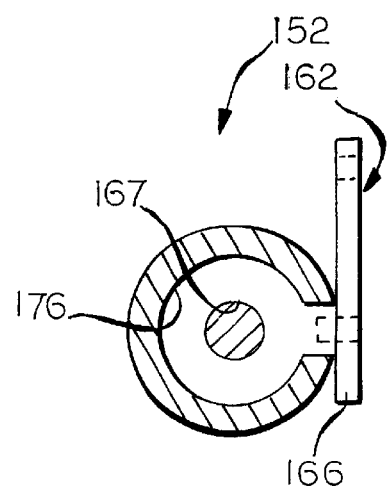
FIG. 4 is a partial cross-sectional view of the lock shown in FIGS. 2 and 3 taken along lines 4—4 in FIG. 3.

The second end 166 of the second support 162 is further provided with an internal thread 167, as shown in FIG. 3. A thumbscrew 174 is provided with an external thread 175 that is threadably engageable with the internal thread 167. The thumbscrew 174 is rotatable in a fixed axial position within a bore 176 through the slide block 152 and along a longitudinal axis A. As thumbscrew 174 is rotated, the second support 162 is axially displaced within a slot 177 and along the axis A by the cooperative engagement of the internal and external threads 167 and 175. This, in turn, permits the toggle assembly 150 to be axially displaced along the axis A by a discrete amount dependent upon the pitch of the threads, thus allowing the toggle assembly 150 to be fine tuned.

Now with reference back to FIG. 5, there is illustrated a longitudinal plate 178 extending substantially radially downward from the slide block 152. The longitudinal plate 178 has a longitudinal slot 180 that is engageable with an upper portion 182 of the mounting bracket 154. The upper portion 182 of the mounting bracket 154 may be provided with a yoke 185 defined by two upwardly extending, laterally spaced apart longitudinal plates 186.

The longitudinal plate 178 extending downwardly from the slide block 152 is structured and dimensioned to be received within the yoke 185 of the mounting bracket 154. The longitudinal plates 186 defining the yoke 185 have coaligning longitudinal slots 188. When the longitudinal slot 180 in the longitudinal plate 178 extending from the slide block 152 is aligned with the coaligning longitudinal slots 188 in the longitudinal plates 186 defining the yoke 185, a fastener, such as the hex cap screw 190 shown, may be inserted into and through the slots 180 and 188. A lock nut 192 is threadably engageable with the hex cap screw 190 to rigidly couple the longitudinal plate 178 extending from the slide block 152 to the longitudinal plates 186 defining the yoke 185.

By loosening the lock nut 192, the placement of the longitudinal plate 178 extending from the slide block 152 may be varied relative to the longitudinal plates 186 defining the yoke 185 by sliding the slide block 152 axially along the longitudinal axis A (shown in FIGS. 2 and 3) through the slide block 152. This, in turn, varies the location of the slide block 152, and thus, varies the location of the toggle assembly 150 relative to the rear wheel 116 to accommodate wheels of varying diameter and insure proper frictional contact between the interference member 168 and the rear wheel 116. This provides a greater variation in the location of the toggle assembly 150 than is provided by the thumbscrew 174 set forth above, and thus, provides a greater variation in the frictional contact between the interference member 168 and the rear wheel 116 than is provided by adjusting the thumbscrew 174.

As illustrated in FIG. 1, the mounting bracket 154 may be non-symmetrical in shape. For example, note that the forward and rear portions 151 and 153 of the mounting bracket 154 project rearwardly. Note also that the angle $\alpha$ of projection (relative to the vertical axis V) of the rear portion 153 is greater than the angle $\phi$ of projection of the forward portion 151. The non-symmetric shape of the mounting bracket 154 permits the mounting bracket 154 from the right side of the wheelchair 110 to be swapped with the mounting bracket 154 of the left side (not shown), and vice versa, to further vary the longitudinal placement of the slide block 152 and the toggle assembly 150 relative to the rear wheel 116. This may further provide a substantial variation in the frictional contact between the interference member 168 and the rear wheel 116.

Figure 6:
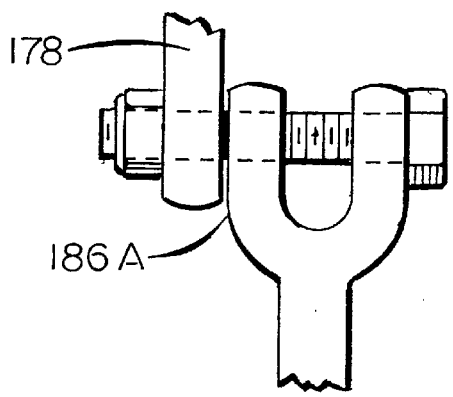
FIG. 6 is a partial front view in elevation of the slide block and the mounting bracket shown in FIG. 5, with the slide block plate coupled to an outermost plate of the mounting bracket.
Figure 7:
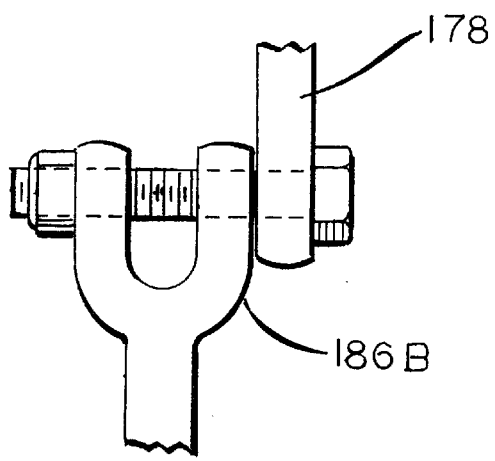
FIG. 7 is a partial front view in elevation of the slide block and the mounting bracket shown in FIG. 5, with the slide block plate coupled to an innermost plate of the mounting bracket.

The lateral placement of the slide block 152 may be varied by varying the position of the slide block 152 relative to the mounting bracket 154. For example, the longitudinal plate 178 of the slide block 152 may be coupled to the outer lateral surface of the laterally outermost longitudinal plate 186A, as shown in FIG. 6, to space the toggle assembly 150 laterally away from the side frame 112. Alternatively, the longitudinal plate 178 of the slide block 152 may be coupled to the inner lateral surface of the laterally innermost longitudinal plate 186B, as shown in FIG. 7, to space the toggle assembly 150 laterally inward towards or closer to the side frame side frame 112 (shown in FIG. 1).

Figure 5:
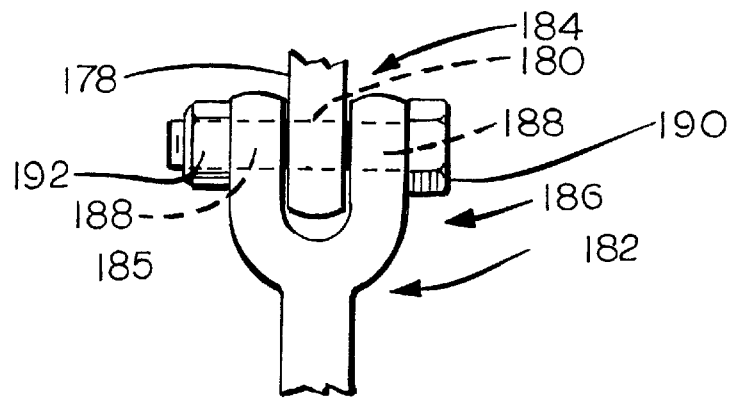
FIG. 5 is an enlarged partial front view in elevation of a slide block plate of the invention received in a mounting block yoke.

The interference member 168 is preferably arranged so as to be located in close proximity to a forwardmost portion of the rear wheel 116, such as in close proximity to a longitudinal axis C extending radially from the hub 144 of the rear wheel 116, when the lock 148 engaged. The interference member 168 preferably has a lateral dimension sufficient to make surface contact with the tire, diagrammatically represented as 146 (shown in FIG. 1), of the rear wheels 116, regardless of whether the slide block 152 is mounted within the yoke 185, as shown in FIG. 5, or the slide block 152 is mounted outside the yoke 185 against the outermost or innermost longitudinal plate 186A or 186B defining the yoke 185, as shown in FIGS. 6 and 7.

In one embodiment of the invention, the mounting bracket 154 is structured and dimensioned to attach to a forward portion of the side frame 112. In particular, the mounting bracket 154 is structured and dimensioned to attach to the lower frame tube 128 at some point between the front frame tube 122 and within about four inches rearward of the caster housing 134, or to the front frame tube 122. The mounting bracket 154 according to this invention is further structured and dimensioned to support the slide block 152, the toggle assembly 150, and the lever 171 in a zone Z (shown in FIG. 1) bounded horizontally between the front frame tube 122 and the rear wheel 116 and vertically between the seat tube 126 and the lower frame tube 128.

Figure 8:
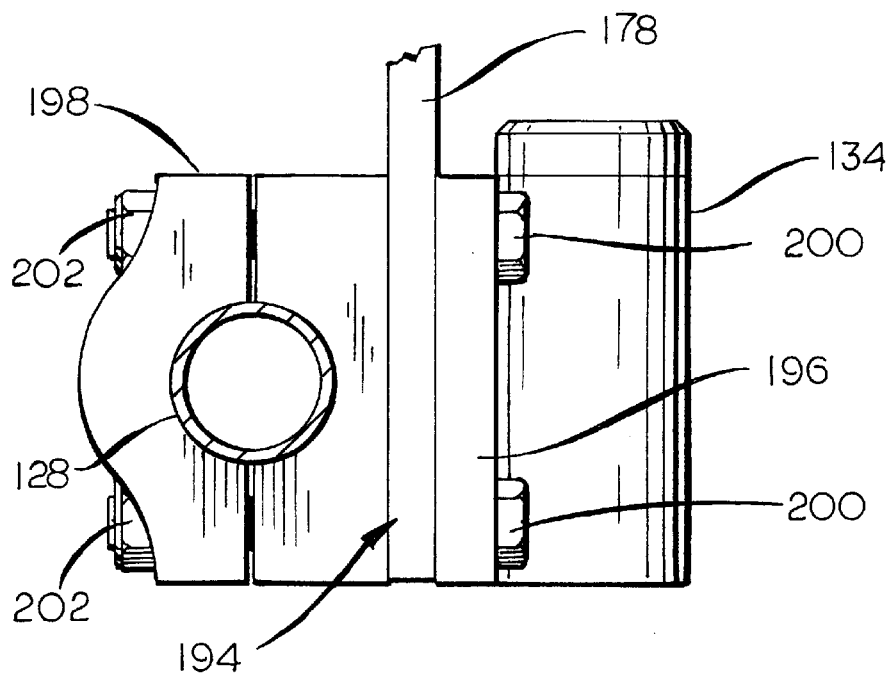
FIG. 8 is a partial front elevational view of the mounting bracket and a caster housing plate bracket mounted to the wheelchair side frame with a tube clamp.

In another embodiment of the invention, the lower portion 194 of the mounting bracket 154 may be structured and dimensioned to be mounted between a caster housing plate bracket 196 and a tube clamp 198, as shown in FIG. 8. The caster housing plate bracket 196 may be located at the front portion of the side frame 112, and is most preferably located in or on the front frame tube 122 or a front portion of the lower frame tube 128, as shown in FIG. 1.

Figure 9:
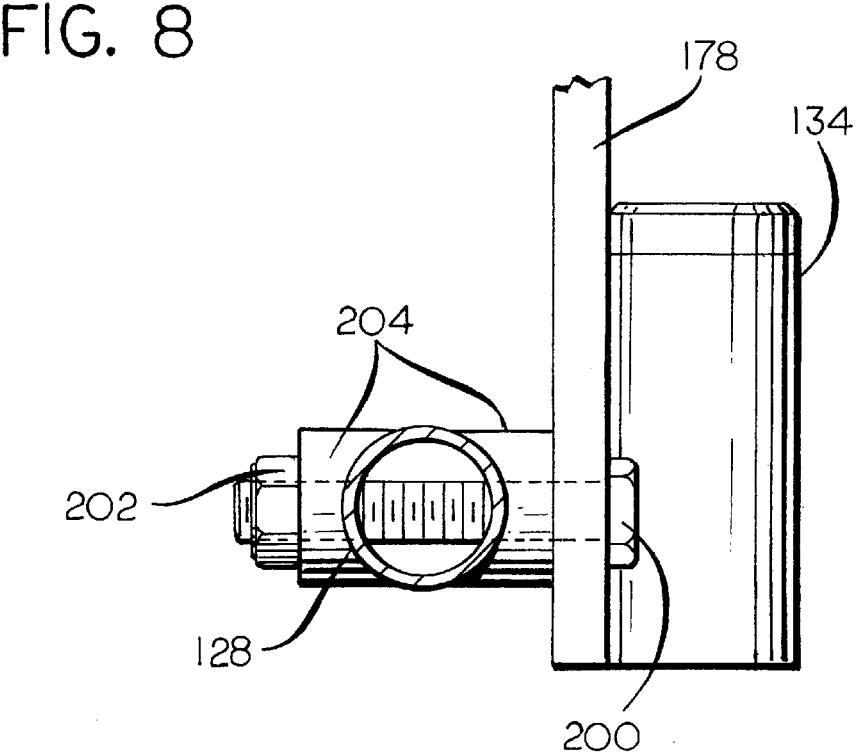
FIG. 9 is a partial front elevational view of an integral mounting bracket and caster housing mounted to the side frame with saddle washers.

Alternatively, the mounting bracket 154 may be an integral part of the caster housing 134, as shown in FIG. 9. For example, the mounting bracket 154 may be fixed to the caster housing 134, such as by welding, so that the mounting bracket 154 extends upwardly from the caster housing 134, as shown in the drawing. Integrating the mounting bracket 154 and the caster housing 134 consolidates components, and thus, reduces the number of parts that would otherwise be required if the components were separate.

Referring back to FIG. 8, there is illustrated a mounting bracket 154 and a caster housing plate bracket 196 mounted to the lower frame tube 128 of the side frame 112 of a wheelchair 110 by a tube clamp 198 and fasteners, namely, the hex cap screws 200 and lock nuts 202 shown. Alternatively, saddle washers 204, such as shown in FIG. 9, may be substituted in the place of the tube clamp 198. Coaligning holes may be provided in the side frame 112 of the wheelchair 110. These coaligning holes are adapted to coalign with a hole in the saddle washers 204. Fasteners, such as the hex cap screw 200 shown, may pass through the coalinging holes and lock nuts 202 may be tightened onto the hex cap screw 200 to secure the mounting bracket 154 and the caster housing plate bracket 196 to the side frame 112 of a wheelchair 110.

Figure 10:
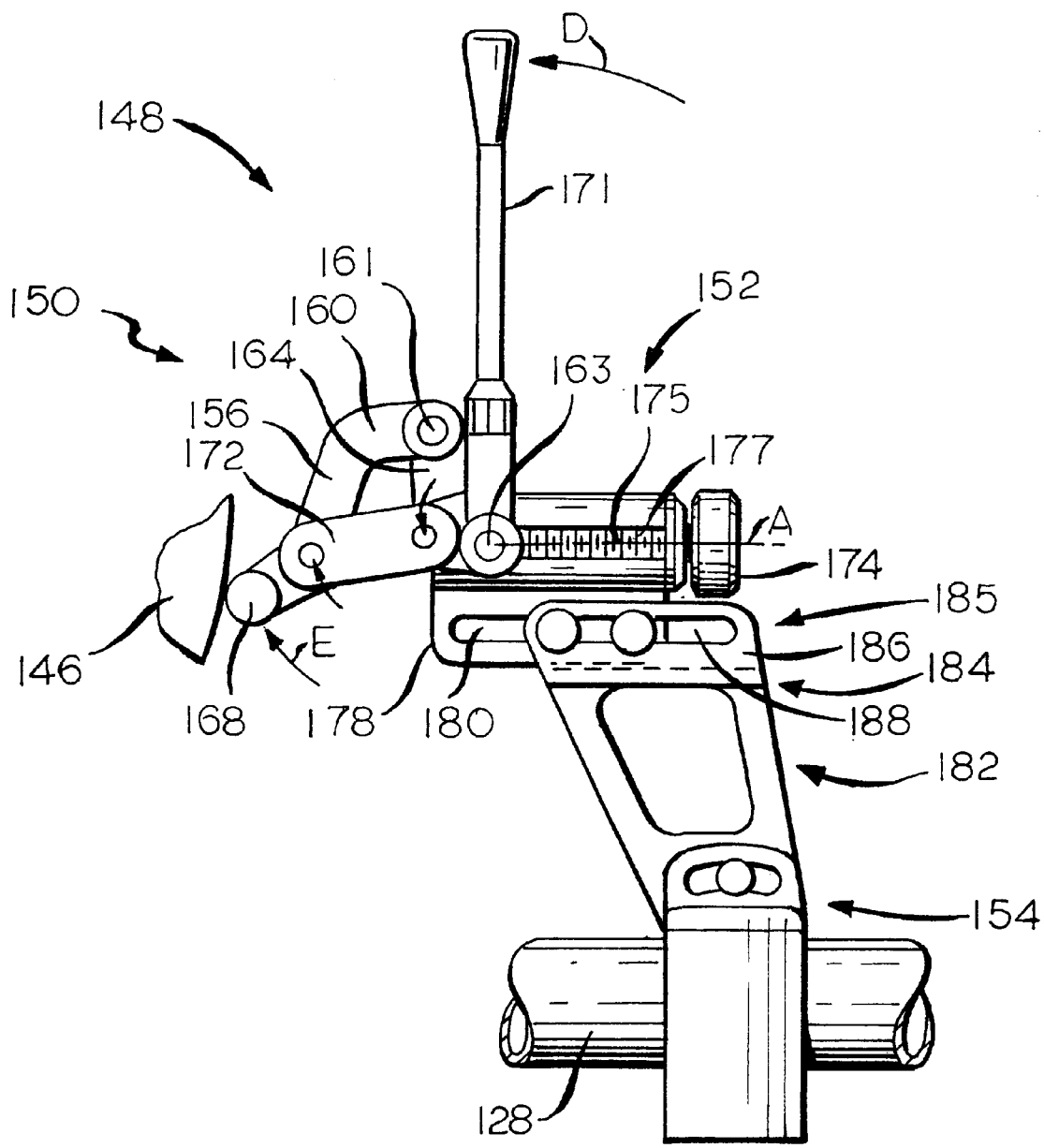
FIG. 10 is a partial side elevational view of the lock shown in FIG. 2 further shown in a locked position.

The operation of the lock 148 is best understood with reference to FIG. 10. The mounting bracket 154 is attached to the side frame 112 of the wheelchair 110 (shown in FIG. 1). The slide block 152 is affixed to the mounting bracket 154. The toggle assembly 150 is threadably engaged with the thumb screw 174 and, thereby, supported by the slide block 152. The lever 171 is displaceable in the direction of the arrow D to effect movement of the interference member 168 in the direction of the arrow E to engage the inference member 168 with the tire 146 of the rear wheel 116 of the wheelchair 110.

As set forth in the description above, to make substantial adjustments in the frictional contact between the inference member 168 and the tire 146, the slide block 152 may be adjusted along the longitudinal axis A. Alternatively, substantial adjustments in the frictional contact between the inference member 168 and the tire 146 may be made by substituting the left mounting bracket (not shown) in the place of the right mounting bracket 154 because of the non-symmetrical shape of the mounting brackets. To make more discrete adjustments in, or to fine tune, the frictional contact between the inference member 168 and the tire 146, the slide block 152 may be displaced along the longitudinal axis A by turning the thumb screw 174. Also as set forth above, the lateral placement of the interference member 168 may be adjusted by securing the slide block 152 to the mounting bracket within the yoke 185 defined by the mounting bracket 154 (as illustrated in FIG. 5) or outside of the yoke 185 (as illustrated in FIGS. 6 and 7).

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope. For example, the toggle assembly shown and described is provided for illustrative purposes. It should be understood that other assemblies may be suitable for carrying out the invention. Moreover, the configuration for fine tuning the toggle assembly is likewise provided for illustrative purposes. Other configurations may be suitable for changing the longitudinal placement or location of the toggle assembly.

It should further be understood that the fine tuning configuration may be omitted and that the toggle assembly may be rigidly attached to the slide block. Moreover, the slide block may be omitted or rigidly attached to the mounting bracket.

Clearly, the present invention is not intended to be limited to the embodiments described above, but encompasses any and all embodiments within the scope of the following claims.

What is claimed is:

1. A wheel lock for a wheelchair comprising a side frame and a caster housing mountable to the side frame, said wheel lock comprising:

a mounting bracket attachable to the side frame of the wheelchair, said mounting bracket having a yoke;

a slide block;

a longitudinal plate extending from said slide block, said longitudinal plate being engageable with said yoke;

a toggle assembly supported by said slide block, said toggle assembly having an interference member; and a lever linked to said toggle assembly, said lever being displaceable to effect movement of said toggle assembly to engage said interference member with a wheelchair wheel.

2. A wheel lock according to claim 1, wherein said interference member includes a knurled pin.

3. A wheel lock according to claim 1, wherein said mounting bracket is non-symmetrical in shape.

4. A wheel lock according to claim 1, further including:

means for fine tuning frictional contact between said interference member and the wheelchair wheel.

5. A wheel lock for a wheelchair comprising a side frame and a caster housing mountable to the side frame, said wheel lock comprising:

a mounting bracket attachable to the side frame of the wheelchair;

a slide block supported by said mounting bracket, said slide block having a bore;

a toggle assembly supported by said slide block, said toggle assembly having an interference member;

a thumb screw within said bore, said thumb screw being engageable with said toggle assembly and being rotatable to displace said toggle assembly relative to said slide block; and a lever linked to said toggle assembly, said lever being displaceable to effect movement of said toggle assembly to engage said interference member with a wheelchair wheel.

6. A wheel lock according to claim 5, wherein said interference member includes a knurled pin.

7. A wheel lock for a wheelchair comprising a side frame, said wheel lock comprising:
- a mounting bracket attachable to the side frame of the wheelchair, said mounting bracket having a yoke;
- a slide block;
- a longitudinal plate extending from said slide block, said longitudinal plate being engageable with said yoke;
- a toggle assembly supported by said slide block, said toggle assembly having an interference member; and
- a lever linked to said toggle assembly, said lever being displaceable to effect movement of said toggle assembly to engage said interference member with a wheelchair wheel.

8. A wheel lock for a wheelchair comprising a side frame, said wheel lock comprising:
- a mounting bracket attachable to the side frame of the wheelchair;
- a slide block supported by said mounting bracket, said slide block having a bore;
- a toggle assembly supported by said slide block, said toggle assembly having an interference member; and
- a thumb screw within said bore, said thumb screw being engageable with said toggle assembly and being rotatable to displace said toggle assembly relative to said slide block; and
- a lever linked to said toggle assembly, said lever being displaceable to effect movement of said toggle assembly to engage said interference member with a wheelchair wheel.

9. A wheel lock according to claim 8, wherein said interference member includes a knurled pin.

10. A wheel lock for a wheelchair comprising a side frame, a caster housing, and a caster housing plate bracket mounted to a front portion of the side frame, said wheel lock comprising:
- a mounting bracket having a lower portion that is structured and dimensioned to be mounted between the caster housing plate bracket and the caster housing;
- a toggle assembly supported by said mounting bracket, said toggle assembly having an interference member; and
- a lever linked to said toggle assembly, said lever being displaceable to effect movement of said toggle assembly to engage said interference member with a wheelchair wheel.

* * * * *